United States Patent Office 3,431,015
Patented Mar. 4, 1969

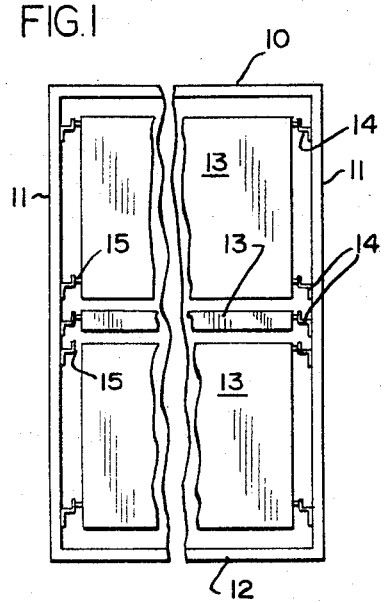
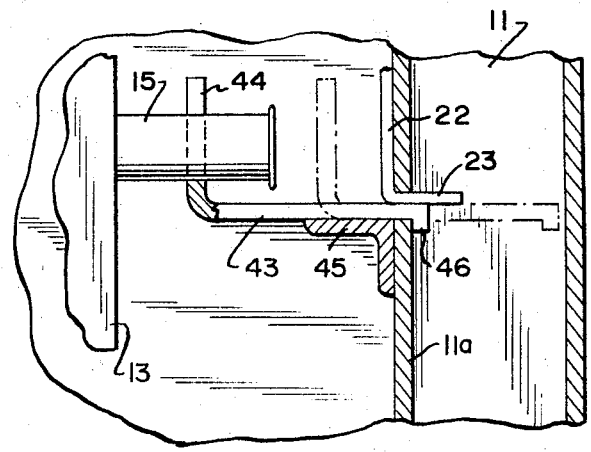
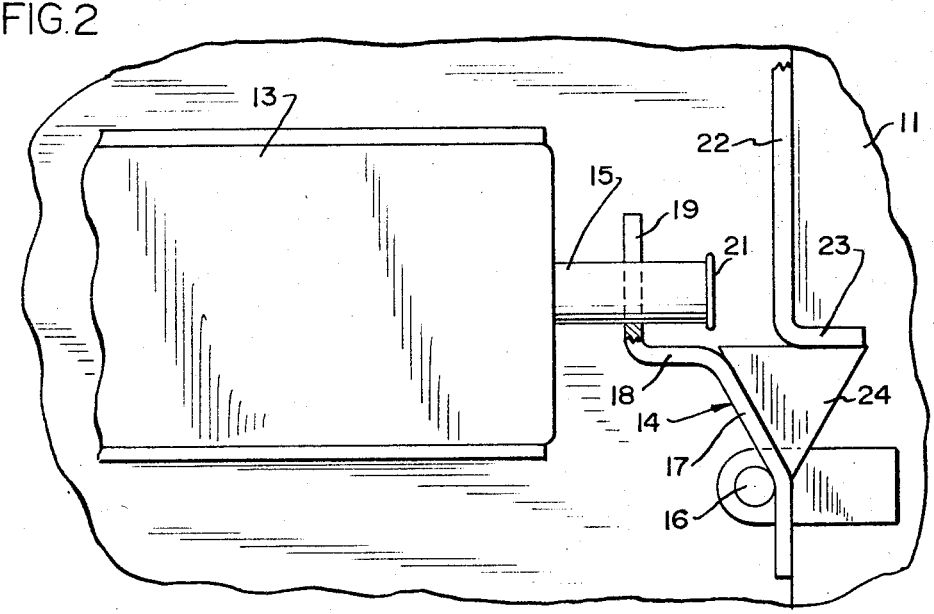

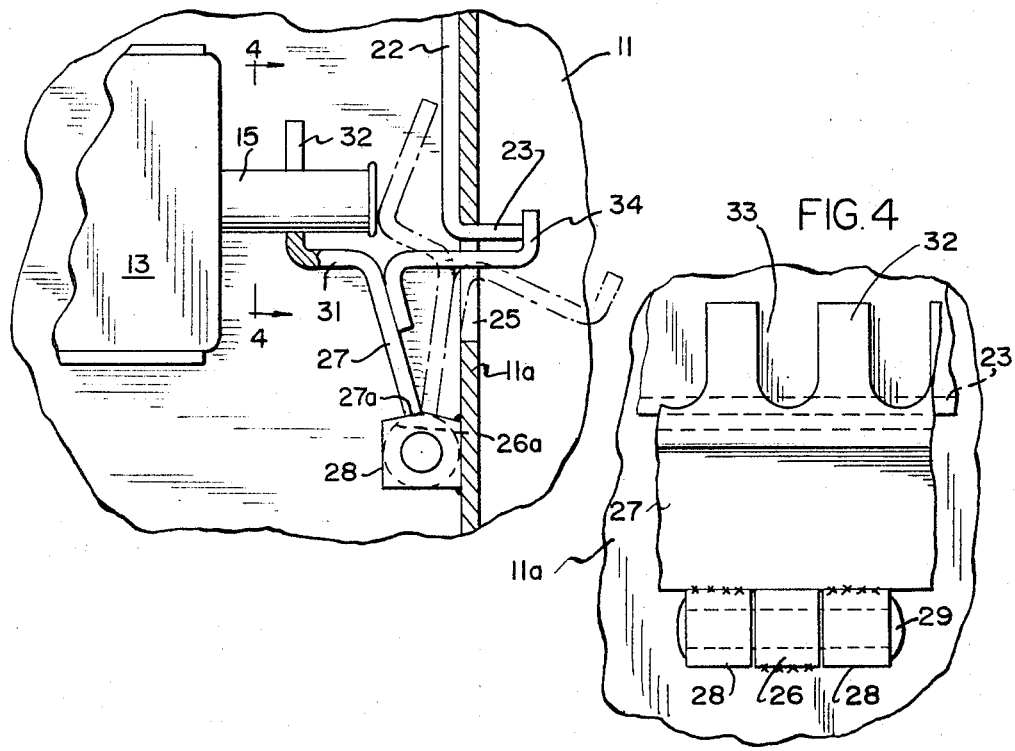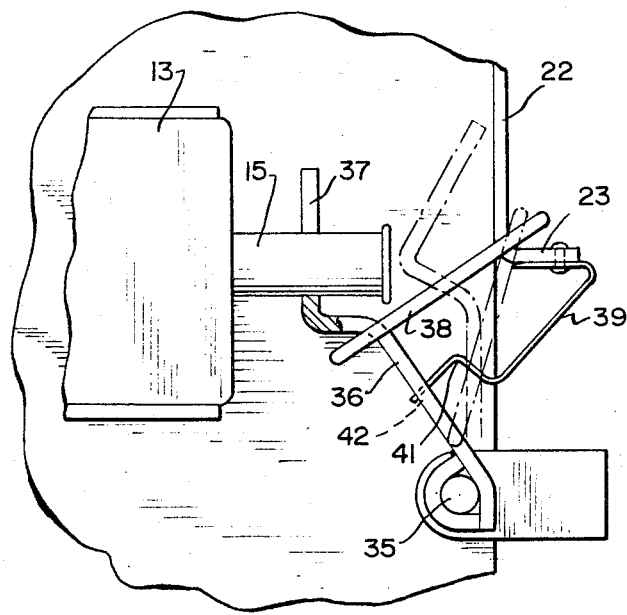

3,431,015
LADING SUPPORTING AND SEPARATING MEANS
Henry D. Breen, Chicago, and Russell M. Loomis, Palos Heights, Ill., assignors to Unarco Industries, Inc., Chicago, Ill., a corporation of Illinois
Filed Feb. 10, 1967, Ser. No. 615,139
U.S. Cl. 296—24          9 Claims
Int. Cl. B62d 33/04; B61d 45/00, 17/00

ABSTRACT OF THE DISCLOSURE

A lading separating and support means for a freight-carrying body is provided by a combination of elongated apertured tracks that extend along the opposed side walls of the body and are arranged for cooperation with rectangular planar panels that may be mounted on the tracks selectively in a horizontal or upright attitude. The panels have outwardly extending support pins for entry into apertures on the track means, and the track means are movable between an operative position spaced inwardly from the wall of the body, and an inoperative position spaced closely adjacent the wall of the body, the latter so as to create minimum interference with normal storage of lading within the body.

---

This invention relates to lading supporting and separating means, and more particularly to apparatus for supporting and separating lading in a lading receiving body such as a railroad car, a truck, a trailer or the like.

It has heretofore been proposed to support and separate lading in a lading receiving body by rectangular panels which function either as pallets to support the lading or as lading dividers. Such panels are supported in the lading receiving body by pins or similar supporting means projecting from the ends thereof which engage openings in tracks mounted on the side walls of the body.

Because of variations in the width of such lading supporting bodies it is desirable to mount the tracks so that they project inwardly an appreciable distance from the body side walls and to provide relatively long pins to engage the tracks. When a body such as a railroad car, a truck or a trailer is used for other purposes in which the panels are not employed, the tracks projecting inwardly from the side walls interfere with loading thereof and reduce the capacity thereof.

It is accordingly an object of the present invention to provide lading supporting and separating means in which the tracks are movably mounted on the side walls of a lading receiving body for movement from a retracted position closely adjacent to the side walls and in which they create a minimum interference with normal use of the lading receiving space to a projected operating position in which they can receive and support the panels.

According to a feature of the invention, the tracks are pivotally mounted on projecting pads and rest on the pads so that the pivot pins are not required to carry the weight of the tracks and the panels or lading.

According to another feature of the invention, the tracks are retained in retracted position by spring latches or detents.

The above and other objects and features of the invention will be more readily apparent from the following description when read in connection with the accompanying drawings, in which:

FIGURE 1 is a reduced scale more or less diagrammatic section through a lading receiving space provided with lading supporting and separating means embodying the invention;

FIGURE 2 is an enlarged partial transverse section;

FIGURE 3 is a view similar to FIGURE 2 of an alternative construction;

FIGURE 4 is a partial view on the line 4—4 of FIGURE 3, showing the track and the supporting means therefor in elevation;

FIGURE 5 is a view similar to FIGURE 2 of still another alternative construction; and FIGURE 6 is a view similar to FIGURE 2 of a further alternative construction.

As illustrated in FIGURE 1, the lading supporting and separating means of the present invention is adapted to be used in connection with a lading receiving body such as a railroad car, a truck body, a trailer body, or the like which has a roof 10, side walls 11, and a floor 12. This structure may be purely conventional and the side walls particularly may or may not be provided with an inner lining or panel but may be open vertical beams as is common particularly in many types of railroad cars.

Lading may be supported in the body on panels indicated generally at 13, which are rectangular in shape and of a length to span the body substantially from side to side thereof. The panels 13 may be installed in a horizontal position, as illustrated by the central panel shown in FIGURE 1, in which lading is supported thereon at various distances of the floor of the car, or may be installed in a vertical position, as illustrated by the upper and lower panels, in which they serve to divide the interior of the space into compartments in which lading is confined. The panels are supported in the car in either the horizontal or vertical position on tracks indicated generally at 14, which are mounted on the side walls of the body and which extend inwardly therefrom. The tracks are formed with openings or notches therein which receive pins 15 projecting from the ends of the panels and fitting into the openings or notches in the tracks to secure the panels in the body against longitudinal movement therein. Since there may be a variation in the width of the body from side to side thereof, it becomes necessary to have the tracks project inwardly from the side walls a substantial distance and to make the pins 15 relatively long. This will insure that the pins will properly engage the tracks when the body is of either maximum or minimum width. However, when the body is used for receiving lading in manners other than through use of the panels 13, the inwardly projecting tracks are apt to create appreciable interference with storage or handling of commodities in the lading receiving space.

According to the present invention, this difficulty is alleviated by mounting the tracks on the side walls of the body for movement from a retracted position closely adjacent to the side wall to an extended position projecting inwardly therefrom. One means of accomplishing this is illustrated in FIGURE 2 wherein the track 14 is illustrated as being pivoted on its lower end to a hinge 16, which is secured to the side wall or to the vertical beams defining the side wall. As shown, the track includes a portion 17 extending upwardly and inwardly of the body at an acute angle from the hinge, a horizontal portion 18 projecting inwardly of the body and a vertical flange 19 formed with upwardly opening notches to receive the pins 15. The pins 15, as shown, are provided with enlarged heads 21 which normally lie between the flange 19 and the body side wall to prevent accidental removal of the pins in a horizontal direction from the tracks.

A channel-shaped strip as shown at 22 is secured to the side wall or to the inner edges of the beams defining the side wall, and has a horizontal lower flange 23 projecting outwardly either between the side wall beams or through an opening in the side wall, which extends from the hinge to the level of the flange. The plate 22 serves partially as a guide plate to be engaged by the ends of the pins 15 when the panels are being handled by a fork lift truck or the like, to prevent catching of the pins between the side walls beams. The lower flange 23 of the channel 22 serves as a stop to limit outward movement of the track. For this purpose the angular portion 17 of the track has secured thereto one or more triangular pieces 24 whose upper edges will engage the flanges 23 when the track is in its inwardly projecting position, as shown in FIGURE 2, to limit further inward swinging thereof.

In using this apparatus for normal use with the panels 13 the tracks are swung inwardly to the position shown in FIGURE 2, and the panels may be mounted thereon in the usual manner by dropping the pins 15 into the upwardly opening notches in the track flanges 19. When in this position the tracks function in the usual manner to support and secure the panels in place. When the lading receiving body is to be used for conventional loading without employment of the panels, the tracks may be swung clockwise, as seen in FIGURE 2, to move the flanges 19 thereof closely adjacent to the inner side wall of the car. In this position the tracks project a minimum distance into the lading receiving body and create minimum interference with normal use thereof.

FIGURES 3 and 4 illustrate another embodiment of the invention, parts therein identical with corresponding parts in FIGURES 1 and 2, being indicated by the same reference numerals. In this construction, the side wall 11 is provided with an inner liner 11A, which is formed with an opening 25 therethrough, immediately beneath the level of each of the tracks. The panels 13 and pins 15 may be identical with those shown in FIGURES 1 and 2.

In this construction, each of the tracks is pivotally supported on a pad 26 secured to the side wall of the car and projecting inwardly therefrom. The track has a lower angular portion 27 to the lower edges of which there are secured hinge collars or rings 28 pivotally connected to the pad 26 by a pintle 29. At its upper end the track has a horizontal inwardly extending flange 31 and terminates in a vertical flange 32, formed with upwardly opening notches 33 therein, as best seen in FIGURE 4. A Z-shaped strip 34 is secured to the track portion 27 and projects outwardly through the opening 25 to terminate in an upwardly extending flange. When the track is swung to its inwardly projecting operative position as shown in full lines in FIGURE 3, this flange will engage the outer edge of the horizontal flange 23 of the channel strip 22 to limit further inward movement of the track. At the same time this construction will permit free swinging of the track to the retracted dotted-line position, as shown in FIGURE 3.

According to one feature of this construction, the upper surface 26a of the pad 26 is so shaped that the lower edge 27a of the track portion 27 will seat thereon in either the extended or retracted position of the track. In this way, when the track is in its extended position and is supporting one or more panels, the weight of the track, the panels and the lading thereon will be transferred directly to the pads 26 without loading the hinges and requiring that the hinges be made strong enough to support the entire load.

FIGURE 5 illustrates still another embodiment of the invention, parts therein which are identical with like parts in the preceding figures being indicated by the same reference numerals. In this construction, the track is hinged at its lower edge by a hinge 35 to the side wall of the body and has a lower portion 36 extending upwardly and inwardly from the hinge at an acute angle. At its upper end the track terminates in a normally vertical flange 37, which is provided with notches as in the preceding structures. In the construction shown in FIGURE 5, inward swinging of the track to its operative position is limited by a yoke 38 which is looped over the track which may be cut away for this purpose and is similarly looped over the horizontal flange 23 of the channel strip 22 which may also be cut away to receive the yoke. When the track is swung inwardly to its operative position as shown in full lines in FIGURE 5, the ends of the yoke 38 will engage both the channel strip 22 and the track to limit further inward movement of the track and to assist in supporting the weight of the track and a panel and lading carried thereby. When the track is swung to its retracted position, the yoke will simply drop down to the position shown in dotted lines where it as well as the track structure is closely adjacent to the car side wall to create minimum interference.

FIGURE 5 also illustrates a spring latch or detent to hold the track in its retracted position adjacent to the side wall of the body. As shown, this comprises a spring strip 39 secured at one end to the flange 23 of the channel strip 22 and extending downwardly and inwardly of the body therefrom. Adjacent to its lower end the spring strip is formed with an offset bend therein to create an upwardly facing rounded projection as shown at 41, and the lower end of the strip extends through an opening 42 in the track portion 36. When the track is in its extended operative position, the straight end of the spring strip extends shortly through the opening 42 but need not engage any portion of the track. However, when the track is swung to its retracted position as shown in dotted lines, the upper edge of the opening 42 will spring over the upwardly facing projection 41, which will then engage the outer surface of the track portion 36 yieldingly to hold the track in its retracted position.

FIGURE 6 shows still another alternative embodiment of the invention, and parts therein identical to corresponding parts in the preceding figures are indicated by the same reference numerals. In this construction, as in FIGURES 3 and 4, the side wall is provided with an inner liner 11A, although this is not essential. The flange 23 of the strip 22 extends through an opening in the side wall, and the opening is large enough to leave a space beneath the flange 23 to receive a horizontal flange 43 on a track member. The track is completed by a vertically extending flange 44 which is formed with notches to receive the pins 15 as in the preceding constructions.

The side wall in this construction carries an angle strip 45 having an upper horizontal flange projecting inwardly of the body and on which the track flange 43 is slidable. The track flange 43 is preferably formed with an inner downwardly projecting stop 46 to limit inward movement thereof in the body.

In using this construction when panels are to be supported on the tracks, the tracks are pulled inwardly of the body to the full line position shown. In this position, the horizontal track flanges are supported on the angle strips 45 and are held against tilting by the flanges 23 of the channel strips 22. The tracks are, therefore, rigidly supported with sufficient strength to carry the panels and the lading supported thereon. When it is not desired to use the tracks, they are slid outwardly to the dotted line position shown, in which they extend a minimum distance into the body and create minimum interference with normal use thereof.

What is claimed is:

1. In combination with a generally rectangular lading receiving body, a rectangular panel of a length substantially to span the body from side to side, supporting and restraining pins projecting from the ends of the panel, a horizontal track at each side of the body formed with openings therein to receive the pins thereby to support the panel and to hold it against longitudinal movement in the body, each track including a portion normally projecting inwardly from a side wall of the body in which the openings are formed, means mounting the track on the side wall for swinging pivotal movement on a horizontal axis of said portion from its inwardly projecting position to a position closely adjacent to the side wall, and means to limit movement of said portion in a direction inwardly from the side wall, the pivotal connection of the track to the side wall including a pad secured to the side wall and projecting inwardly therefrom and the track having a lower edge portion engaging the pad to support the track and panel independently of the pivotal connection.

2. The construction of claim 1 in which said track portion comprises an upwardly extending flange normally spaced from and generally parallel to the side wall and formed with upwardly opening notches to receive the pins and in which the pins extend horizontally from the panel ends and are formed with enlarged heads at their outer ends.

3. A lading separating and support means for a freight carrier body having spaced elongated side walls, comprising, in combination: vertically spaced, horizontally extending, apertured tracks extending along and adapted to be spaced inwardly of opposed side walls of the body and adapted for aperture-receiving cooperation with elements on a panel for retaining the panel in selected positions in the car; an elongated, rectangular planar panel of a length substantially to span the tracks on the side walls of the body and having at both ends of the panel a pair of support members spaced from each other and extending outwardly of the ends of the panel, each support member having thereon an aperture-entering portion and a restraining portion, the aperture-entering portion being shaped and arranged to be selectively entered and withdrawn from an aperture of said apertured tracks and adapted to cooperate with said tracks on the walls of the body to prevent longitudinal movement of the panel along the tracks regardless of whether the panel is disposed horizontally or vertically, and the restraining portions of the support members at opposite ends of the panel providing spaced abutment surfaces spaced apart a distance greater than the length of the panel and greater than the minimum spacing between the tracks on opposed walls, so that the restraining portions of the support members are adapted to cooperate with the tracks to prevent dislocation of the panel relative to the tracks in directions transverse to the tracks; and means mounting each track for selective movement between an operative position, where the track is spaced inwardly of the adjacent wall of the body to receive thereon the support members of a panel, and an inoperative position where the track is located closer to the adjacent wall of the body to create minimum interference with normal use of the lading-receiving space of the body.

4. A construction as in claim 3 wherein the means mounting the track for selective movement between operative and inoperative positions includes a support on the adjacent wall of the body, a horizontal pivot carried on the support, the track being arranged to swing on the horizontal pivot, and stop means for limiting swinging of the track inwardly away from the adjacent wall and so as to define the operative position for said track.

5. A construction as in claim 4 wherein the stop means includes engagement of a portion of the track with a part of the support on the wall of the body, such engagement effecting support of the track and any panel thereon substantially independent of the pivotal connection between the track and the horizontal pivot.

6. A construction as in claim 4 wherein the stop means includes a lateral aperture in the adjacent wall, a stop member adjacent the aperture, and a member on the track arranged to extend through the aperture when the track is in its inoperative position and arranged to engage the stop member when the track swings into its operative position.

7. A construction as in claim 3 including spring means engaging the track to releasably hold it in the inoperative position adjacent the side wall.

8. A construction as in claim 4 wherein the stop means includes a link pivotally connected to the side wall and engageable with the track when the track swings away from its adjacent wall.

9. A construction as in claim 3 wherein the means mounting each track for selective movement between operative and inoperative positions includes a support shelf fixed on the adjacent wall of the body, an aperture defined in said adjacent wall above the support shelf, the track including a horizontally elongated part arranged for horizontal sliding on the support shelf and extending through said aperture to provide for support of the track on the support shelf for all positions of the track relative to the adjacent wall.

References Cited
UNITED STATES PATENTS

| 1,144,031 | 6/1915 | Fuller | 105—370 |
| 1,576,784 | 3/1926 | Planett | 211—153 |

LEO FRIAGLIA, *Primary Examiner.*
ROBERT R. SONG, *Assistant Examiner.*

U.S. Cl. X.R.
105—369, 376